UNITED STATES PATENT OFFICE.

EDWARD D. CAMPBELL AND ROBERT J. CARNEY, OF ANN ARBOR, MICHIGAN.

RECOVERY OF THORIUM.

1,182,880. Specification of Letters Patent. Patented May 9, 1916.

No Drawing. Application filed February 15, 1916. Serial No. 78,523.

*To all whom it may concern:*

Be it known that we, EDWARD D. CAMPBELL and ROBERT J. CARNEY, citizens of the United States, residing at Ann Arbor, in the county of Washtenaw, State of Michigan, have invented certain new and useful Improvements in the Recovery of Thorium, of which the following is a specification.

Our invention relates to the separation and recovery of thorium from monazite sand and other materials containing the thorium in admixture with other rare earth metals.

The invention is based upon the discovery that the pyrophosphates of thorium, ceric cerium, and zirconium are insoluble in dilute acids, while the pyrophosphates of cerous cerium and the other rare earth elements are readily soluble in dilute acids. This difference in the solubility of the pyrophosphates is the basis of the novel method of the present invention.

It has been heretofore proposed to precipitate thorium as pyrophosphate by adding pyrophosphoric acid to a thorium salt, and the solubility of thorium pyrophosphate in an excess of sodium pyrophosphate, to form a double pyrophosphate, has also been noted. The striking difference in the solubility of the pyrophosphates in acid, noted above, has not, however, in so far as we are aware, been noticed prior to our discovery.

According to the present invention, the thorium is separated from the metals forming acid soluble pyrophosphates by precipitating the thorium as pyrophosphate in the presence of an acid, as by the addition of a soluble pyrophosphate to an acid solution of the metals. This selective method of precipitating the thorium as pyrophosphate in the presence of an acid is of particular value for the separation and recovery of thorium from monazite sands and the like, since the thorium can be selectively precipitated directly from solutions of the sand, for example, the sulfuric acid solution, by the addition of a suitable soluble pyrophosphate, such as sodium pyrophosphate, without first separating the thorium and the other rare earth elements from the phosphoric acid of the solution. From such solutions of the sand the thorium is precipitated with substantial completeness as pyrophosphate, and it carries down with it only small amounts of other rare earth salts. In order to remove these small amounts of other salts, where such removal is necessary or desirable, the precipitated thorium pyrophosphate can be dissolved and re-precipitated as the pyrophosphate.

The normal sodium salt, $Na_4P_2O_7.10H_2O$, is the most convenient pyrophosphate to use for precipitating the thorium. It is inexpensive and is readily obtained. A water solution of this salt is very stable, and there is no appreciable hydrolysis to orthophosphate even after standing for a long time or on heating.

Thorium pyrophosphate dissolves readily on heating with an excess of sodium pyrophosphate. It dissolves with difficulty in a large excess of pyrophosphoric acid and is precipitated from this solution slowly by heating, and rapidly by adding a strong acid and heating. It is soluble also in ammonium carbonate and in alkali oxalate solutions. From solutions of the double pyrophosphate, thorium is completely precipitated by boiling with an excess of sodium hydroxid. It is not precipitated from this solution by ammonium hydroxid or by oxalic acid; if the solution is strongly acidified after adding oxalic acid, a mixture of oxalate and pyrophosphate is precipitated. The addition of a strong acid to the double pyrophosphate breaks it up and causes the precipitation of thorium pyrophosphate.

In order to precipitate thorium completely as the pyrophosphate, the solution must be boiled after adding the sodium pyrophosphate, otherwise small amounts of thorium will remain in solution. The acidity should be about 0.3 N or equal to 5 cc. of hydrochloric acid (1.19) in 200 cc. of solution. If the acidity is very much too low, some thorium may fail to be precipitated by going into the form of the double pyrophosphate; if too high, the solvent effect of the acid comes into play. The acidity may, however, vary within fairly wide limits without the loss of any thorium.

Zirconium is completely precipitated from a solution under the same conditions as thorium.

The pyrophosphates of cerous cerium, praseodymium, neodymium, lanthanum yttrium, ytterbium, and erbium are soluble in an excess of sodium pyrophosphate. Freshly precipitated pyrophosphates of each of these metals are readily dissolved on the addition of dilute hydrochloric acid. On adding an oxidizing agent, such as bromin water, to the solution of cerous pyrophosphate and heating, a white precipitate of ceric pyrophosphate is formed immediately. On the other hand, by adding a suitable reducing agent, such as a sulfurous acid solution, to solutions containing ceric cerium, the cerium will be reduced to the cerous condition, and its precipitation as pyrophosphate prevented. The thorium can accordingly be obtained substantially free from cerium by precipitation of the pyrophosphates in the presence of a suitable reducing agent. Where it is desirable to obtain the cerium together with the thorium as pyrophosphates, any cerous cerium can be oxidized to the ceric condition before precipitation, and the mixed pyrophosphates then precipitated.

As above noted, the pyrophosphate of zirconium is also insoluble in dilute acids, and, when present in solutions of thorium, will be precipitated as pyrophosphate therewith. Where zirconium is thus precipitated, the precipitate can be further treated for the removal of the zirconium. This removal can be effected by dissolving the mixture of thorium and zirconium and precipitating the thorium as the oxalate, zirconium oxalate being soluble in an excess of oxalic acid. Thorium oxid can be obtained from the oxalate by ignition.

The solution of the precipitated thorium pyrophosphate can, with advantage, be effected by the use of concentrated sulfuric acid, the pyrophosphoric acid being changed to the orthoacid. On cooling and adding water to the mixture of concentrated sulfuric acid and thorium sulfate, a clear solution results.

Where it is desired to change the thorium completely to an oxalate entirely free from phosphate, it has been found best to first change the sulfate to hydroxid by boiling with sodium hydroxid, filter this, dissolve it in hydrochloric acid and precipitate as oxalate.

Where it is desired to effect a second precipitation of the thorium as pyrophosphate, in order to remove the small amounts of rare earth salts that are carried down, this re-precipitation can be easily accomplished in the following manner: The sulfate solution of the pyrophosphate precipitate is treated with ammonium hydroxid until alkaline, neutralizing with hydrochloric acid, acidifying and diluting to the desired extent, heating the solution to boiling and precipitating with sodium pyrophosphate. The resulting precipitate is free or substantially free from other rare earth salts. The pyrophosphate can be again dissolved, if desired, as sulfate, and then converted into the hydroxid and oxalate in the manner above described, where it is desired to recover the thorium in this way.

From solutions containing thorium without containing other rare earth metals, the thorium can be quantitatively recovered as the pyrophosphate in the manner above described. From solutions containing thorium and other rare earth metals, such as cerium, praseodymium, neodymium, and lanthanum, the thorium can also be recovered substantially quantitatively as pyrophosphate. Where the removal from the pyrophosphate precipitate of such small amounts of other rare earth salts as are contained therein is necessary or desirable, this can be effected by a re-precipitation, as above indicated.

As above noted, the novel method of the present invention is of particular value for the recovery of thorium from monazite sand, inasmuch as the thorium can be selectively precipitated therefrom as pyrophosphate, by the addition of a soluble pyrophosphate to the acid solution of the sand, without first separating the metals from the phosphoric acid. The solution of the sand can be effected by decomposing it with concentrated sulfuric acid. The sulfate may then be dissolved in water, separated from the residue by filtration, still further diluted if necessary to obtain a low acidity, and the thorium precipitated from this solution with sodium pyrophosphate. The acidity may, with advantage, be that above specified. The acidity may, however, as also noted above, vary within fairly wide limits without the loss of any thorium. Small amounts of ceric pyrophosphate tend to be precipitated with the thorium. This tendency can be prevented or minimized by the addition of concentrated hydrochloric acid to the solution. Where the precipitate contains cerium or traces of other rare earth phosphates, not soluble in hydrochloric acid, these can be removed by a re-precipitation in the manner above described. In the presence of a large amount of cerium, such as is found in monazite sand, it has been found advisable to add a little sulfurous acid solution to reduce any ceric cerium before precipitating the second time as the pyrophosphate. Where it is desired to avoid all traces of other rare earth phosphates in the final product, this can be effected by precipitating the sulfuric acid solution with sodium hydroxid instead of ammonium hydroxid, filtering and washing the precipitate and dissolving it in the proper amount of acid. The hydroxid precipitate can be filtered with suction and the filtration and washing rapidly effected.

The invention will be further illustrated by the following more detailed description of a specific application thereof to the treatment of monazite sand: A suitable amount of the sand, for example, 5 kilos, are heated to about 250 degrees with ten liters of concentrated sulfuric acid, in a thick walled covered iron dish, until complete decomposition is obtained. This may be determined by cooling and adding water to a small portion of the mass and examining the undecomposed mineral fragments with a magnifying glass. The characteristic appearance of undecomposed monazite can be readily recognized. The complete decomposition will require about 5-8 hours. The excess of sulfuric acid is not driven off. The mixture is cooled and introduced slowly into about 40 liters of cold water contained in a receptacle provided with cooling means. The mixture is stirred and allowed to stand until the sulfates are dissolved. The solution is then filtered and the residue washed. A suitable amount of hydrochloric acid is then added, e. g., about 10 liters (1.19), and the solution is diluted to about 900 liters. This is stirred and about 30 liters of sodium pyrophosphate solution are slowly added, this solution being made by dissolving 2.5 kilos of $Na_4P_2O_7.10H_2O$, in 50 liters of water. After addition of the sodium pyrophosphate, the solution is then heated to boiling, and stirred when near the boiling point, and is boiled gently for five minutes. As a rule, after boiling begins, no attention is required, as the precipitate does not tend to settle. After boiling the solution is allowed to stand for five or ten minutes and is then filtered. The precipitate is washed several times with hot water containing a few drops of hydrochloric acid. In order to dissolve the precipitate, a suitable amount of sulfuric acid (1.84) is added, for example, about 30 liters, and the mixture is heated until it changes to a clear liquid. The sulfate is always slightly yellow. The mixture is cooled to room temperature, and water e. g. 200 liters is added slowly with stirring to dissolve the sulfate. The solution is poured into a solution of sodium hydroxid containing, for example, about 60 kilos of sodium hydroxid in about 250 liters of water. The mixture is stirred and boiled for several minutes, and the hydroxid is then filtered by the aid of suction. It is washed a number of times with hot water. It is then dissolved in hydrochloric acid (1.19), for example, about 20 liters, further diluted with about 300 liters of water and the solution is boiled. The solution is then further diluted to about 300 liters, a small amount e. g. 6 liters of saturated sulfurous acid solution added, the solution heated to boiling, and the thorium again precipitated with sodium pyrophosphate. The precipitate can be washed and changed to sulfate and hydroxid in the manner just described. This second sulfate is white and always dissolves completely in water. Where the thorium oxalate is desired, the hydroxid is dissolved in concentrated hydrochloric acid, the solution is diluted and boiled, and the thorium is precipitated by a suitable solution of oxalic acid, containing, for example, about 4 kilos of the acid. The solution is diluted to about 900 liters and allowed to stand over night. The oxalate can then be filtered, washed with water very faintly acidified with hydrochloric acid, and ignited to the oxid, where the oxid instead of the oxalate, is the final product desired.

The method of the present invention enables the thorium oxid to be obtained substantially or entirely free from other rare earth metals, and uncolored by them. Furthermore, thorium oxid can be obtained in the manner above described, free from phosphate, as well as free from cerium.

Starting with the filtered sulfuric acid solution of the sand, all of the operations up to the precipitation of the oxalate, where the thorium is to be recovered as oxalate, can be carried out in about seven hours. It will accordingly be noted that the method of recovering the thorium, which forms the subject-matter of the present invention, can be carried out in a relatively short period of time, and with re-agents which are inexpensive and readily available.

We claim:

1. The method of effecting the separation of thorium from its solution, which comprises precipitating the same as pyrophosphate in the presence of an acid, substantially as described.

2. The method of effecting the separation of thorium from its solutions, which comprises precipitating the same as pyrophosphate in the presence of an acid by adding a soluble pyrophosphate to an acid solution of the thorium, substantially as described.

3. The method of effecting the selective separation of thorium from solutions containing the same in admixture with rare earth metals forming acid soluble pyrophosphates, which comprises precipitating the thorium as pyrophosphate in the presence of an acid of sufficient strength to retain the other rare earth metal pyrophosphates in solution, substantially as described.

4. The method of effecting the selective separation of thorium from solutions containing the same in admixture with rare earth metals forming acid soluble pyrophosphates, which comprises adding a soluble pyrophosphate to such a solution to precipitate thorium as pyrophosphate, the precipitation being effected in the presence of sufficient mineral acid to retain the other rare earth metal pyrophosphates in solution, substantially as described.

5. The method of effecting the selective separation of thorium and zirconium from solutions containing the same in admixture with rare earth metals forming acid soluble pyrophosphates, which comprises precipitating the thorium and zirconium as pyrophosphates in the presence of an acid and thereafter separating thorium from zirconium, substantially as described.

6. The method of effecting the selective separation of thorium from solutions containing the same in admixture with cerium, which comprises precipitating the thorium as pyrophosphate in the presence of an acid and of a reducing agent for reducing the cerium to the cerous state, substantially as described.

7. The method of effecting the separation of thorium from its solutions, which comprises precipitating the same as pyrophosphate in the presence of an acid, and boiling the solution to complete the precipitation of the thorium, substantially as described.

8. The method of effecting the selective separation of thorium from monazite sand, which comprises decomposing the sand and forming an acid solution thereof, and selectively precipitating the thorium from such solution as pyrophosphate by the addition of a soluble pyrophosphate, substantially as described.

9. The method of effecting the selective separation of thorium from monazite sand, which comprises decomposing sand with sulfuric acid and forming an acid solution thereof, diluting with water to give a solution of low acidity, and selectively precipitating the thorium from such solution as pyrophosphate by the addition of a soluble pyrophosphate, substantially as described.

10. The method of effecting the selective separation of thorium from solutions containing the same in admixture with rare earth metals forming acid soluble pyrophosphates, which comprises precipitating the thorium as pyrophosphate in the presence of an acid, dissolving the precipitate in sulfuric acid, precipitating thorium hydroxid by means of an alkali, dissolving the hydroxid in an acid, and re-precipitating the thorium as pyrophosphate, substantially as described.

11. The method of effecting the selective separation of thorium from monazite sand and the like, which comprises selectively precipitating the thorium from an acid solution of the sand as pyrophosphate, re-dissolving the pyrophosphate precipitate, and re-precipitating as pyrophosphate in the presence of a reducing agent adapted to reduce any ceric cerium to the cerous condition, substantially as described.

In testimony whereof we have hereunto affixed our signatures.

EDWARD D. CAMPBELL.
ROBERT J. CARNEY.